United States Patent
Tsoungui

(10) Patent No.: US 8,386,497 B2
(45) Date of Patent: Feb. 26, 2013

(54) QUERY GENERATION BASED ON HIERARCHICAL FILTERS

(75) Inventor: Olivier Tsoungui, Bagneux (FR)

(73) Assignee: Business Objects Software Limited, Dublin (IE)

( * ) Notice: Subject to any disclaimer, the term of this patent is extended or adjusted under 35 U.S.C. 154(b) by 293 days.

(21) Appl. No.: 12/879,669

(22) Filed: Sep. 10, 2010

(65) Prior Publication Data

US 2012/0066247 A1    Mar. 15, 2012

(51) Int. Cl.
    *G06F 17/30* (2006.01)
(52) U.S. Cl. ........................... 707/754; 707/769
(58) Field of Classification Search .................. 707/713, 707/718, 732, 759, 769, 754
    See application file for complete search history.

(56) References Cited

U.S. PATENT DOCUMENTS

| | | | | |
|---|---|---|---|---|
| 6,920,462 B2 * | 7/2005 | Kircher | | 1/1 |
| 7,512,662 B2 * | 3/2009 | Lyle et al. | | 709/207 |
| 8,170,912 B2 * | 5/2012 | Bennett et al. | | 705/14.4 |
| 8,244,757 B2 * | 8/2012 | Karlson et al. | | 707/778 |
| 2002/0062311 A1 * | 5/2002 | Kircher | | 707/3 |
| 2005/0055351 A1 * | 3/2005 | Barton et al. | | 707/10 |
| 2005/0149606 A1 * | 7/2005 | Lyle et al. | | 709/200 |
| 2005/0256852 A1 * | 11/2005 | McNall et al. | | 707/3 |
| 2006/0173719 A1 * | 8/2006 | Kuhn et al. | | 705/3 |

* cited by examiner

*Primary Examiner* — Jean M Corrielus
(74) *Attorney, Agent, or Firm* — Buckley, Maschoff & Talwalkar LLC

(57) ABSTRACT

A system includes reception of a query filtered on an object of a hierarchical list of values and comprising a first filter value, generation of an SQL script based on the first filter value and at least one ancestor value of the first filter value in the hierarchical list of values, and retrieval of a data set associated with the query based on the SQL script.

In some aspects, reception of the query includes reception of a command to refresh a document including the query and a prompt on a filter value, presentation of the prompt and the hierarchical list of values, and reception of the first filter value.

27 Claims, 12 Drawing Sheets

| Year | Quarter | Month | Unit Sales |
|---|---|---|---|
| FY1997 | Q1 | January | ~~~~~ |
| FY1997 | Q3 | July | ~~~~~ |
| FY1998 | Q1 | January | ~~~~~ |
| FY1998 | Q3 | July | ~~~~~ |

| Year | Quarter | Month | Unit Sales |
|---|---|---|---|
| FY1997 | Q1 | January | ~~~~~ |

| Year | Quarter | Month | Unit Sales |
|---|---|---|---|
| FY1997 | Q3 | July | ~~~~~ |
| FY1997 | Q3 | August | ~~~~~ |
| FY1997 | Q3 | September | ~~~~~ |

| Year | Quarter | Month | Unit Sales |
|---|---|---|---|
| FY1997 | Q1 | January | ~~~~~ |
| FY1998 | Q3 | July | ~~~~~ |

| Year | Quarter | Month | Unit Sales |
|---|---|---|---|
| FY1997 | Q1 | January | ~~~~~ |
| FY1997 | Q1 | March | ~~~~~ |
| FY1997 | Q3 | July | ~~~~~ |
| FY1997 | Q3 | August | ~~~~~ |
| FY1997 | Q3 | September | ~~~~~ |
| FY1998 | Q3 | July | ~~~~~ |

QUERY GENERATION BASED ON HIERARCHICAL FILTERS

BACKGROUND

Enterprise software systems receive, generate, and store data related to many aspects of a business enterprise. In some implementations, this data may relate to marketing, sales, customer relations, supplier relations, inventory, human resources, and/or finances. Reporting systems are commonly used to present such enterprise data to users in useful formats.

Reporting systems may generate reports based on user-created report specifications. A report specification may include a layout of one or more report parts (e.g., sections, tables, charts, header, footer, etc.) and queries to specify the data that is to populate the report parts. In order to generate a report based on a report specification, a reporting system retrieves stored enterprise data based on the queries, populates the report parts with the retrieved data, and assembles the populated report parts according to the layout.

To facilitate creation of a report specification, reporting systems may interact with a semantic layer including a set of abstract entities known as business objects. Each business object associates one or more physical entities (e.g., a physical database table, associated columns of one or more database tables) of one or more enterprise data sources with user-friendly names. The user-friendly names may represent business entities, such as customers, time periods, financial figures, etc. Business objects may be classified as dimensions along which one may want to perform an analysis or report (e.g., Year, Country, Product), details (e.g., additional information on dimensions), and measures (e.g., Sales, Profit) whose values can be determined for a given combination of dimension values. A report designer may therefore create the queries of a report specification using these user-friendly names instead of references to specific physical entities of the data sources.

A semantic layer may also include a hierarchical list of values (LOV) to facilitate the selection of filter values during the creation of a query. A hierarchical LOV is associated with business objects of the semantic layer. For example, a hierarchical LOV may be associated with the Year, Quarter and Month business objects and may reflect the hierarchy Year >Quarter >Month. Each business object therefore represents a different "level" of the hierarchical LOV.

FIG. 1 illustrates the creation of a query using a hierarchical LOV according to some systems. Specifically, a user has operated query panel 100 in order to create a query that is filtered on the Month object and which returns result objects Year, Quarter, Month and Unit Sales. Hierarchical LOV 110 is presented in tree form to allow the user to intuitively select filter values from the tree. As shown, the user has selected the filter values January (of year 1997) and July (of year 1998).

As mentioned above, conventional reporting systems retrieve stored data based on such user-generated queries. For example, a conventional reporting system may receive the query created in query panel 100 and generate the following Structured Query Language (SQL) script in response:

SELECT time.year_name, time.quarter_name, time.month_name, sum(sales.unit_sales)
FROM time INNER JOIN sales on (time.time_id=sales.time_id)
WHERE time.month_name IN ('January', 'July')

The SQL script is then passed to an SQL server to retrieve a data set from a corresponding data store. FIG. 2 is a tabular representation of such a retrieved data set according to the present example. Due to the above SQL script, data set 200 includes record for January of year 1998 and July of year 1997 even though those months were not selected in hierarchical LOV 110. Conventional systems therefore fail to preserve the uniqueness of the selected filter values in the hierarchy, resulting in the retrieval of undesired data.

Systems are desired to facilitate the creation and execution of a query based on a hierarchical LOV.

DETAILED DESCRIPTION

The following description is provided to enable any person in the art to make and use the described embodiments and sets forth the best mode contemplated for carrying out some embodiments. Various modifications, however, will remain readily apparent to those in the art.

Figures 1, 2:
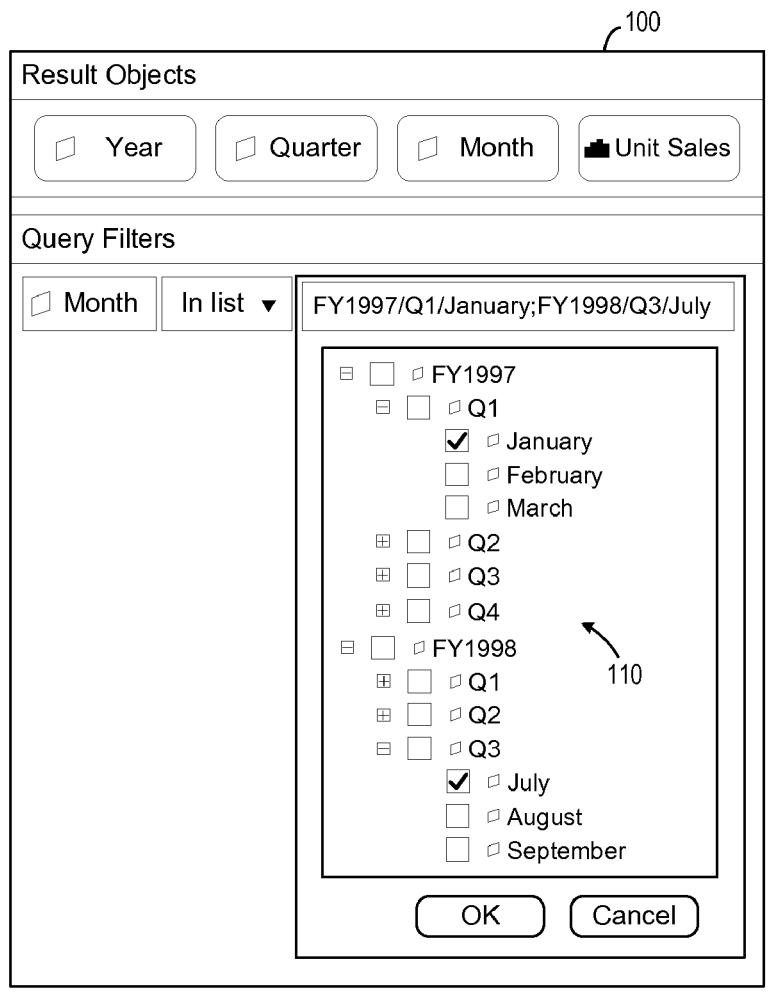
FIG. 1 is a view of a user interface to define a query.
FIG. 2 is a tabular representation of a data set.
Figure 3:
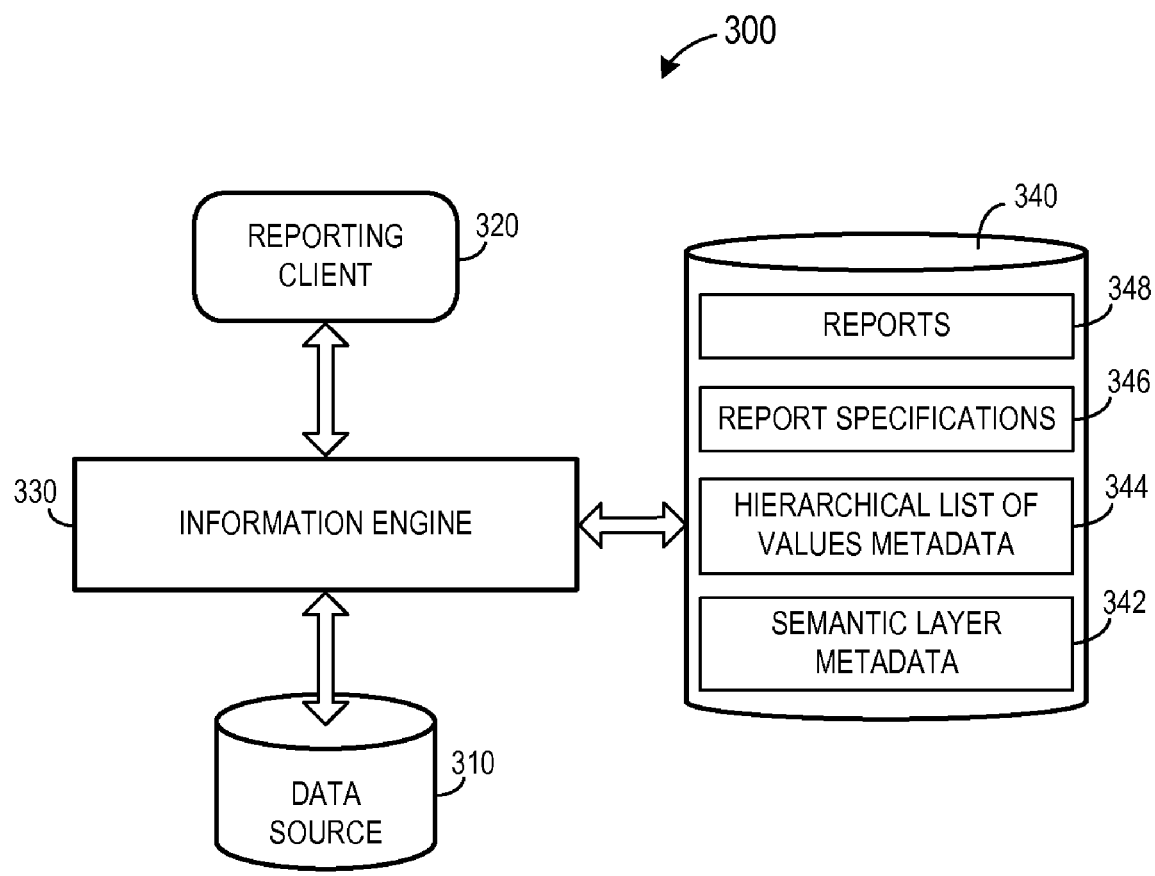
FIG. 3 is a block diagram of a system according to some embodiments.

FIG. 3 is a block diagram of system 300 according to some embodiments. System 300 includes data source 310, reporting client 320, information engine 330 and repository 340. Each element of system 300 may be implemented by any suitable combination of hardware (e.g., one or more processors) and/or software (e.g., processor-executable program code). System 300 may include elements in addition to those illustrated, and some embodiments may omit one or more elements of system 300.

Reporting client 320 may comprise a device executing program code of a software application for object-based report creation. System 300 may include any number of reporting clients of one or more types according to some embodiments.

Repository 340 comprises semantic layer metadata 342, hierarchical LOV metadata 344, report specifications 346, and reports 348. Semantic layer metadata 342 defines objects mapped to logical entities of data source 310. Hierarchical LOV metadata 344 defines hierarchical LOVs associated with the defined objects. Report specifications 346 define report layouts and queries for populating the report layouts, and reports 348 include reports which have been created and populated based on report specifications 346 and data stored in data source 310.

Data source 310 may comprise any query-responsive data source or sources that are or become known, including but not limited to a structured-query language (SQL) relational database management system. Embodiments are not limited to any number or types of data sources. For example, data source 310 may comprise one or more Online Analytical Processing databases, spreadsheets, etc. The data stored in data source 310 may be received from disparate sources (not shown).

Information engine 330 generally provides data of data source 310 to reporting client 320 based on metadata of repository 340. In some embodiments, information engine 330 may communicate with reporting client 320 to allow a user to generate a report specification based on metadata 342 and 344. The report specification may include a query which is filtered on an object of a hierarchical LOV defined by metadata 344 and which specifies a filter value. Information engine 330 receives the query, generates an SQL script based on the query, and forwards the SQL script to data source 310. Data source 310 returns a data set based on the SQL script, and information engine 330 creates a report based on the report specification and the returned data set. The report specification and the populated report may be saved in repository 340 for later access.

Figure 4:
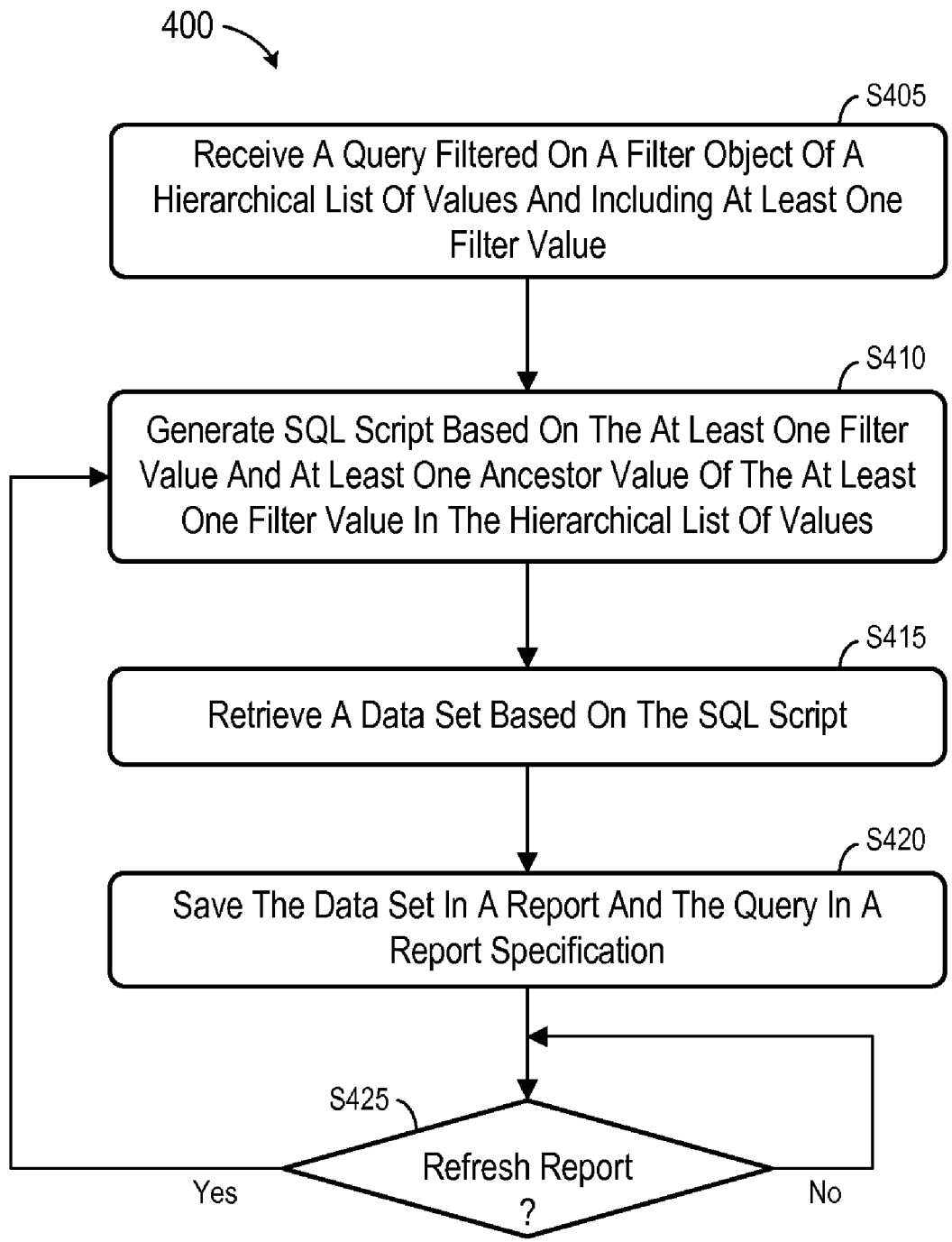
FIG. 4 illustrates a flow diagram of a process according to some embodiments.

FIG. 4 is a flow diagram of process 400 according to some embodiments. Process 400 may be used to retrieve a data set based on a query filtered on an object of a hierarchical LOV. Process 400, and all other processes described herein, may be embodied in program code stored on a non-transitory computer-readable medium and/or implemented by a computer in response to execution of program code by a processor of the computer, but embodiments are not limited thereto.

Figures 5, 6:
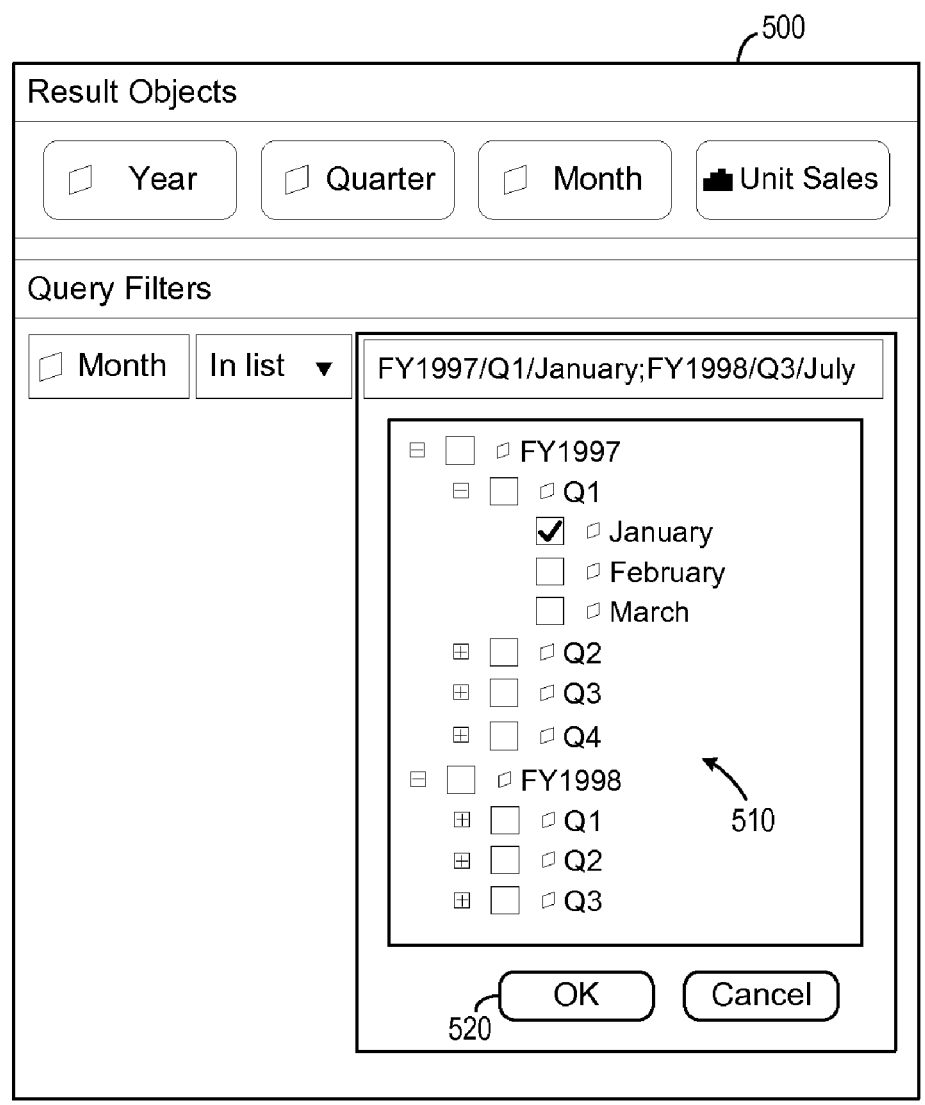
FIG. 5 is a view of a user interface to define a query according to some embodiments.
FIG. 6 is a tabular representation of a data set according to some embodiments.

Initially, at S405, a query is received. The query is filtered on a filter object of a hierarchical LOV and includes at least one filter value. FIG. 5 is an outward view of user interface 500 to define a query filtered on a filter object of a hierarchical LOV according to some embodiments.

The filter object and the hierarchical LOV must be defined prior to S405. In a brief example, a user operates a standalone, Web-based or other application to establish a connection to data source 310 using any suitable database connection (e.g., Java Database Connector, QT/Connection Server), defines business objects based on the underlying schema of data source 310, and then defines one or more hierarchical LOVs associated with the business objects. As mentioned above, the definitions of the business objects may be stored in semantic layer metadata 342 and the definitions of the hierarchical LOVs may be stored in hierarchical LOV metadata 344.

User interface 500 may be presented by any reporting client capable of consuming hierarchical LOVs through query filters or query filter prompts. In the illustrated example, the query is filtered on the Month object and returns result objects Year, Quarter, Month and Unit Sales. The user has selected the filter value "January" (of year "FY1997") from hierarchical LOV 510. Hierarchical LOV 510 is associated with the Year, Quarter and Month business objects and reflects the hierarchy Year >Quarter >Month.

The query is received at S405 upon user selection of OK icon 520. For the present example, it will be assumed that the query is received by information engine 330, although embodiments are not limited thereto. Next, at S410, information engine 330 generates an SQL script based on the filter value and on at least one ancestor value of the filter value in the hierarchical LOV.

Examples of such a generated SQL script according to some embodiments are provided below. Generally, due to the specific instance of "January" selected in hierarchical LOV 510, the SQL script is generated at S410 to select a data set which is associated with the Month "January" of Quarter "Q1" and Year "FY1997". This is in contrast to the SQL script described in the Background, which was not generated based on ancestor values of the selected "January" filter value.

FIG. 6 is a tabular representation of data set 600 retrieved at S415 based on the generated SQL script. As shown, data set 600 reflects the intention of the query designer. More specifically, and in contrast to data set 200, data set 600 does not include data associated with the Month "January" of Year "FY1998".

A report specification including the query may be saved among report specifications 346 at S420. Also at S420, the data set may be formatted into a report based on the report specification, and the report may be saved among reports 348. Thereafter, any user having appropriate authorization may operate any reporting client to request the report from information engine 330.

Flow pauses at S425 until a request to refresh the report is received. Upon receipt of such a request, flow returns to S410 and continues as described above to generate an SQL script based on the query and to retrieve a data set based on the SQL script. The retrieved data set will reflect any changes made to the requested data since a last refresh of the report.

Figure 7:
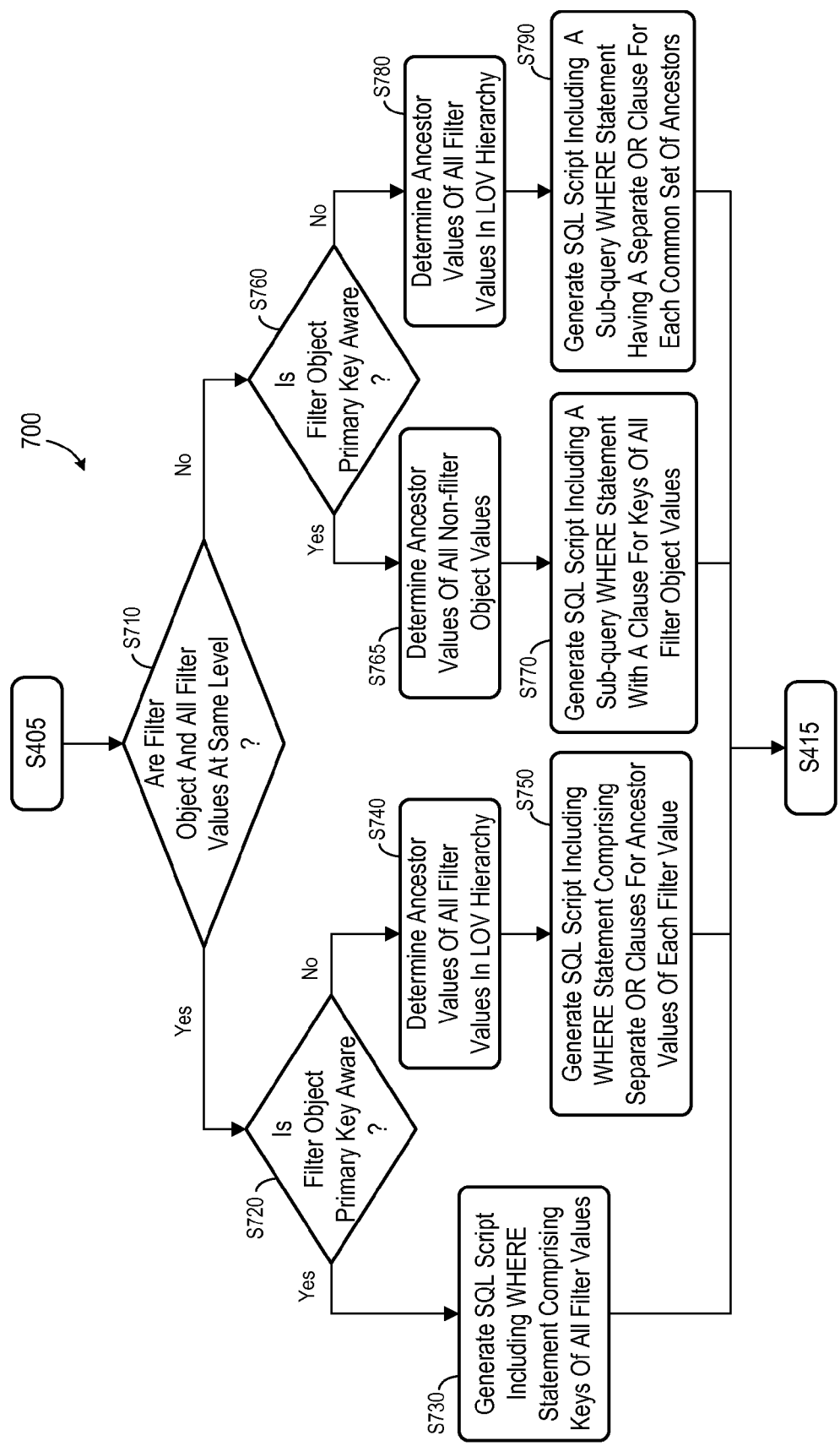
FIG. 7 illustrates a flow diagram of a process according to some embodiments.

FIG. 7 illustrates process 700 according to some embodiments. Process 700 may comprise an implementation of step S410 of process 400, but embodiments of S410 are not limited thereto.

Process 700 begins at S710 at which it is determined whether the filter object of the query received at S405 is at the same level of the hierarchical LOV as all selected filter values. Initially, it will be assumed that FIG. 5 depicts the received query, with the filter object Month and on selected filter value "January".

According to some embodiments, information engine 330 receives several properties associated with the selected filter value at S405. These properties may include VALUE_NAME, VALUE_KEY, VALUE_DEPTH and VALUE_ANCESTORS. VALUE_NAME specifies the name of the selected value, and VALUE_KEY specifies a key (or unique name) of the selected value, if available. In this regard, some hierarchical LOVs can provide keys associated with their values (e.g., if the hierarchical LOV is based on objects exhibiting primary key index awareness). If the filter object of the query also exhibits primary key index awareness, information engine 330 may use these associated keys to select appropriate data from data source 310 as described below.

The VALUE_DEPTH property indicates the distance of the value from the root of the hierarchy, with the root having a VALUE_DEPTH of "0". The VALUE_ANCESTORS property is an array specifying the ancestors of the selected filter value in the hierarchal LOV. The VALUE_DEPTH and VALUE_ANCESTORS properties may only be received at S405 if the filter value is selected from a hierarchical LOV, and not for filter values selected from a flat or tabular LOV.

Continuing with the present example, it will be assumed that the following information is received at S405 based on user selection of filter value "January" as depicted in FIG. 5.

| | | | | VALUE_ANCESTORS | | |
|---|---|---|---|---|---|---|
| selected item | VALUE_NAME | VALUE_KEY | VALUE_DEPTH | name | Key | depth |
| FY1997/Q1/January | January | 19970101 | 2 | FY1997 | 1997 | 0 |
| | | | | Q1 | 199701 | 1 |

Therefore, at S710, and because the hierarchical LOV is defined as a sorted collection of business objects, information engine 330 is able to determine the hierarchical level of the object to which the received filter value belongs based on the value of VALUE_DEPTH. For instance, the VALUE_DEPTH "2" received with the January value indicates the Month object in the hierarchy Year >Quarter >Month. Since this object is identical to the filter object (i.e., Month), it is determined at S710 that the filter object and the filter value are at the same level of the hierarchical LOV.

Next, at S720, it is determined whether the filtered object exhibits primary key index awareness. Currently assuming that the Month object is primary key aware, flow continues to S730 to generate an SQL script. The generated SQL script includes a WHERE statement including a key corresponding to the selected filter value. The key may be obtained from the VALUE_KEY property received at S405, and its identity is based on and reflects ancestors of the selected filter value. For example, the following SQL script may be generated at S730:

```
SELECT    time.year_name, time.quarter_name, time.month_name,
          sum(sales.unit_sales)
FROM      time INNER JOIN sales on (time.time_id=sales.time_id)
WHERE     time.month_id = 19970101
/* where 19970101 is the key of "January" descending from "FY1997"
and "Q1" */
```

Flow then proceeds to S415 and continues as described above to retrieve data set 600. Returning to S720, it is now assumed that the Month object is not primary key aware and, consequently, the received filter value is not associated with a key value (i.e., the value of VALUE_KEY property is null). Accordingly, flow proceeds to S740 to determine ancestor values of the filter value. In the present example of FIG. 5, the ancestor values of "January" in the hierarchical LOV are "Q1" (belonging to the Quarter level) and "FY1997" (belonging to the Year level), and may be determined from the received VALUE_ANCESTORS property.

Determination of the ancestor values allows the SQL script to specify the uniqueness of the selected filter value. More specifically, an SQL script is generated at S750 including a WHERE statement which includes a clause specifying the ancestor values of the filter value, as well as the filter value. As described in FIG. 7, if more than one filter value was received, the WHERE statement would include separate clauses for each filter value and its ancestors, with the clauses separated by the OR operator. An example of this scenario is provided below.

With respect to the currently-described single filter value case, the following SQL script may be generated at S750 according to some embodiments:

```
SELECT    time.year_name, time.quarter_name, time.month_name,
          sum(sales.unit_sales)
FROM      time INNER JOIN sales on (time.time_id=sales.time_id)
WHERE     (time.month_name= 'January' AND
          time.quarter_name= 'Q1' AND time.year_name= 'FY1997')
/* where time.quarter_name is the binding column used by the Quarter
object, and time.year_name is the binding column used by the
Year object */
```

Figures 8, 9:
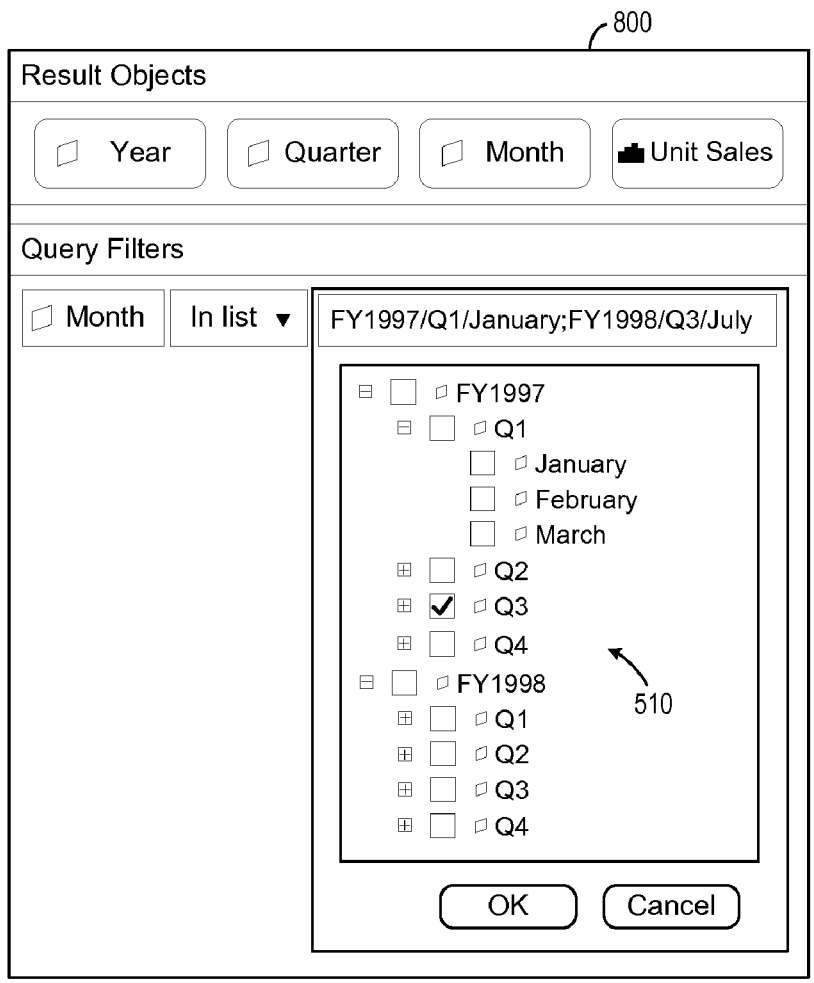
FIG. 8 is a view of a user interface to define a query according to some embodiments.
FIG. 9 is a tabular representation of a data set according to some embodiments.

FIG. 8 is an outward view of user interface 800 defining a query filtered on the Month object and including the filter value "Q3" (of year "FY1997") from hierarchical LOV 510. According to some embodiments, a user can select any value at any level of a hierarchical LOV only if the filter operators are INLIST or NOT INLIST. For the other operators (e.g., EQUAL, NOT EQUAL, GREATER THAN, LESS THAN, etc.), a user may only select filter values of the same level as the filter object.

To continue the description of process 700, it will be assumed that this query is received at S405 with the following properties:

| | | | | VALUE_ANCESTORS | | |
|---|---|---|---|---|---|---|
| selected item | VALUE_NAME | VALUE_KEY | VALUE_DEPTH | name | Key | depth |
| FY1997/Q3 | Q3 | 199703 | 1 | FY1997 | 1997 | 0 |

At S710, and based on the value of VALUE_DEPTH (i.e., "1") it is determined that the selected filter value is associated with the Quarter object of the hierarchy Year >Quarter >Month. Since the filter object is Month, it is also determined at S710 that the filter object and the filter value are not at the same level of the hierarchical LOV.

Next, at S760, it is determined whether the filtered object exhibits primary key index awareness. Assuming that the Month object is primary key aware (and therefore the VALUE_KEY property is non-null), flow continues to S765. At S765, ancestor values of all filter values which are not on the same level as the filter object are determined. In the present example, the ancestor value "FY1997" of the filter value "Q3" is determined at S765 because the filter value "Q3" is not on the same level as the filter object Month.

An SQL script is then generated at S770. The SQL script includes a sub-query WHERE statement including keys corresponding to any selected filter values which correspond to the filter object (i.e., Month), and separate clauses for each other filter value and its ancestors. With respect to the FIG. 8 example, the following SQL script may be generated at S770:

```
SELECT  time.year_name, time.quarter_name, time.month_name,
        sum(sales.unit_sales)
FROM    time INNER JOIN sales on (time.time_id=sales.time_id)
WHERE   time.month_id IN
        (
        /* sub-query clause to get the subset of all months of the
        Q3 quarter */
        SELECT time.month_id
        FROM   time
        WHERE time.quarter_name = 'Q3'
        )
/* where time.quarter_name is the binding column used by the Quarter
object */
```

Since no selected filter value is at the same level as the filter object, the WHERE statement of the sub-query does not include a clause for value keys. A data set is retrieved at S415 based on the generated SQL script. FIG. 9 illustrates data set 900 which may be retrieved at S415 based on the FIG. 8 query. Advantageously, data set 900 does not include rows corresponding to Q3 of FY1998, even though the selected filter value is "Q3".

In a further example, it is now assumed that the query of FIG. 8 is received at S405 but that the Month object is not primary key aware. Therefore, the received filter value (i.e., "Q3") is not associated with a key value (i.e., the value of VALUE_KEY property is null). Flow therefore proceeds from S710 through S760 to S780.

At S780, ancestor values of the selected filter value are determined. The filter value "Q3" has only the ancestor value "FY1997" in the hierarchal LOV. The ancestor value(s) may be determined from the VALUE_ANCESTORS property received at S405.

Next, at S790, an SQL script is generated including a sub-query WHERE statement which includes a clause specifying the ancestor values of the filter value, as well as the filter value. If more than one filter value was received at S405, the WHERE statement would include separate clauses for each common set of ancestor values, with the clauses separated by the OR operator. Details of a corresponding example will be described below.

According to the present example, the following SQL script may be generated at S790:

```
SELECT  time.year_name, time.quarter_name, time.month_name,
        sum(sales.unit_sales)
FROM    time INNER JOIN sales on (time.time_id=sales.time_id)
WHERE   time.year_name + " " + time.quarter_name + " " +
        time.month_name IN
        (
        /* using sub-query to get all year-quarter-month tuples of the Q3 quarter
        of FY1997 */
        SELECT time.year_name + " " + time.quarter_name +
        " " + time.month_name
        FROM   time
        WHERE
```

```
        (time.quarter_name = 'Q3' AND time.year_name = 'FY1997')
        )
/* where time.quarter_name is the binding column used by the Quarter
object, and time.year_name is the binding column used by the Year
object */
```

The foregoing SQL script uses the concatenation function (i.e., time.year_name+" "+time.quarter_name+" "+time.month_name) in the sub-query to preserve the ancestor values of the filter value, and to thereby preserve the uniqueness of the selected filter value (i.e., "Q3") within the hierarchical LOV.

Data set 900 is then retrieved at S415 based on the generated SQL script.

Figures 10, 11:
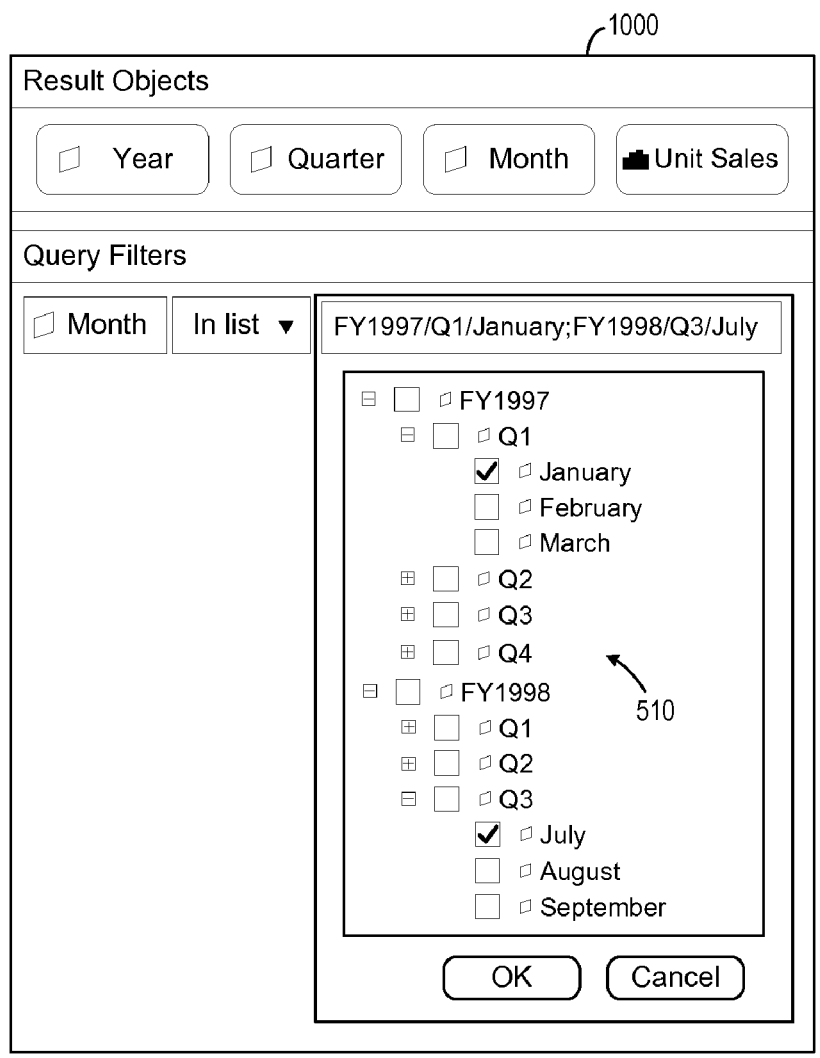
FIG. 10 is a view of a user interface to define a query according to some embodiments.
FIG. 11 is a tabular representation of a data set according to some embodiments.

The foregoing examples related to the selection of single filter values. In some embodiments, a user may select more than one filter value at any level of the hierarchical LOV. FIG. 10 illustrates user interface 1000 in which a user has created a query and selected two filter values (i.e., "January" and "July") of hierarchical LOV 510.

Process 700 may be used to generate an SQL script based on receipt of such a multi-valued query. The received query may include the following property values:

| selected item | VALUE_NAME | VALUE_KEY | VALUE_DEPTH | VALUE_ANCESTORS name | Key | depth |
|---|---|---|---|---|---|---|
| FY1997/Q1/January | January | 19970101 | 2 | FY1997 | 1997 | 0 |
|  |  |  |  | Q1 | 199701 | 1 |
| FY1998/Q3/July | July | 19980307 | 2 | FY1998 | 1998 | 0 |
|  |  |  |  | Q3 | 199803 | 1 |

At S710, it is determined whether the filter object (i.e., Month) is at the same level as all the selected filter values. Each selected filter value is associated with the VALUE_DEPTH "2", indicating the Month object in the hierarchy Year >Quarter >Month. Since the filter object is also the Month object, it is determined at S710 that the filter object and all the selected filter values are at the same level of the hierarchical LOV.

Next, at S720, it is determined whether the filtered object exhibits primary key index awareness. Assuming that the Month object is primary key aware, an SQL script is generated at S730. The generated SQL script includes a WHERE statement including keys corresponding to all selected filter values. The keys may be obtained from the VALUE_KEY property received at S405, and reflect the ancestors of the selected filter value. For example, the following SQL script may be generated at S730:

```
SELECT  time.year_name, time.quarter_name, time.month_name,
        sum(sales.unit_sales)
FROM    time INNER JOIN sales on (time.time_id=sales.time_id)
WHERE   time.month_id IN (19970101, 19980307)
```

Flow then proceeds to S415 and continues as described above to retrieve data set 1100. In contrast to data set 200 described in the Background, which was retrieved based on the same selected filter values (i.e., "January" and "July"), data set 1100 correctly omits data corresponding to January 1998 or July 1997.

If, at S720, it was determined that the Month object is not primary key aware (e.g., by determining that the value of the VALUE_KEY property is null), flow proceeds to S740 to determine ancestor values of the filter values. The ancestor values may be determined from the received VALUE_ANCESTORS property. In the present example of FIG. 10, the ancestor values of selected value "January" in the hierarchical LOV are "Q1" and "FY1997", and the ancestor values of selected value "July" are "Q3" and "FY1998".

An SQL script is generated at S750 including a WHERE statement which includes a separate OR clause for each filter value and its ancestor values. With respect to the present example, the following SQL script may be generated at S750 according to some embodiments:

```
SELECT   time.year_name, time.quarter_name, time.month_name,
         sum(sales.unit_sales)
FROM     time INNER JOIN sales on (time.time_id=sales.time_id)
WHERE
(
  (time.month_name= 'January' AND time.quarter_name= 'Q1' AND
time.year_name= 'FY1997')
  OR
  (time.month_name= 'July' AND time.quarter_name= 'Q3' AND
time.year_name= 'FY1998')
)
```

This SQL script may then be used at S415 to retrieve data set 1100.

Figures 12, 13:
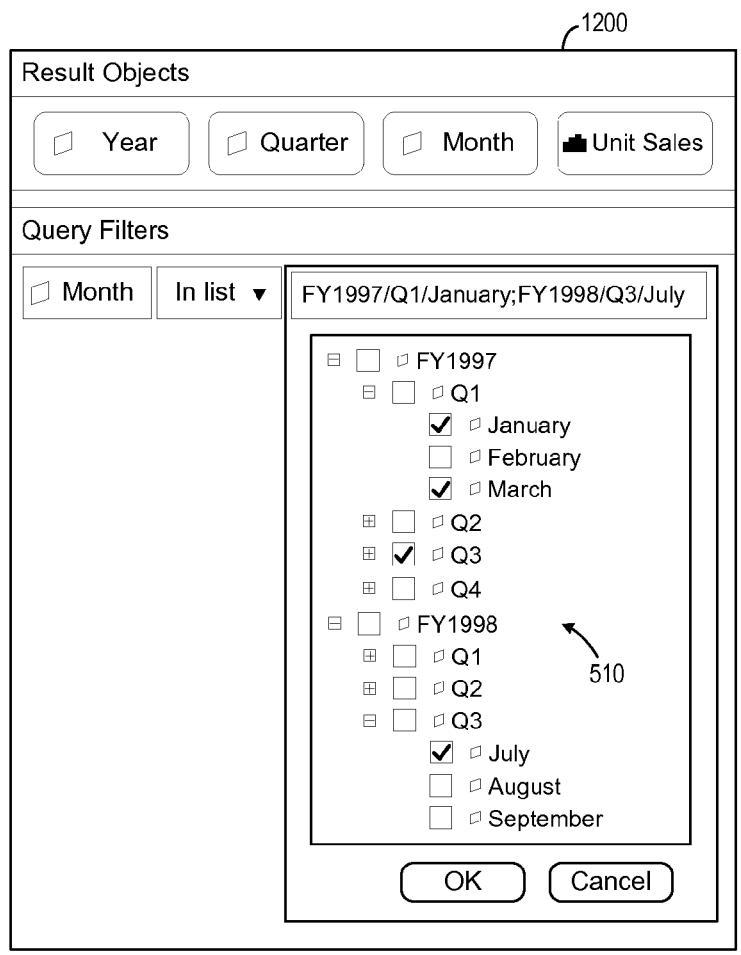
FIG. 12 is a view of a user interface to define a query according to some embodiments.
FIG. 13 is a tabular representation of a data set according to some embodiments.

User interface 1200 of FIG. 12 defines a query filtered on the Month object and including several filter values selected from hierarchical LOV 510. According to some embodiments, this query is received at S405 with the following properties:

| selected item | VALUE_NAME | VALUE_KEY | VALUE_DEPTH | VALUE_ANCESTORS name | Key | depth |
|---|---|---|---|---|---|---|
| FY1997/Q1/January | January | 19970101 | 2 | FY1997 | 1997 | 0 |
|  |  |  |  | Q1 | 199701 | 1 |
| FY1997/Q1/March | March | 19970103 | 2 | FY1997 | 1997 | 0 |
|  |  |  |  | Q1 | 199701 | 1 |
| FY1997/Q3 | Q3 | 199703 | 1 | FY1997 | 1997 | 0 |
| FY1998/Q3/July | July | 19980307 | 2 | FY1998 | 1998 | 0 |
|  |  |  |  | Q3 | 199803 | 1 |

At S710, and based on the VALUE_DEPTH property, it is determined that the selected filter values "January", "March", "Q3" and "July" are associated with the objects Month, Month, Quarter and Month, respectively, of the hierarchy Year >Quarter >Month. Since the filter object is Month, it is also determined at S710 that the filter object and the filter values are not all at the same level of the hierarchical LOV.

Therefore, at S760, it is determined whether the filtered object exhibits primary key index awareness. Again assuming that the Month object is primary key aware, flow continues to S765. At S765, ancestor values of all filter values which are not on the same level as the filter object are determined. In the present example, the ancestor value "FY1997" of the filter value "Q3" is determined at S765 because the filter value "Q3" is the only selected filter value which is not on the same level as the filter object Month.

An SQL script is then generated at S770. The SQL script includes a sub-query WHERE statement including keys corresponding to any selected filter values which correspond to the filter object (i.e., Month), and separate clauses for each other filter value and its ancestors. The keys may be obtained from the VALUE_KEY property, and their identity is based on and reflects the ancestors of the corresponding filter values. Continuing with the FIG. 12 example, the following SQL script may be generated at S770:

```
SELECT   time.year_name, time.quarter_name, time.month_name,
         sum(sales.unit_sales)
FROM     time INNER JOIN sales on (time.time_id=sales.time_id)
WHERE    time.month_id IN
(
  SELECT time.month_id
  FROM   time
  WHERE
  (
    (time.month_id IN (19970101, 19970103, 19980307)
    OR
    (time.quarter_name = 'Q3' AND time.year = 'FY1997')
  )
)
```

A data set such as data set 1300 of FIG. 13 is then retrieved at S415 based on the generated SQL script. As shown, data set 1300 includes rows corresponding to January of 1997, March of 1997, July, August and September of 1997 (i.e., selected filter value Q3 filtered by month), and July of 1998.

It will now be assumed that the query of FIG. 12 is received at S405 and that the Month object is not primary key aware. Therefore, none of the received filter values are associated with a key value. Flow therefore proceeds from S710 to S780 via S760.

At S780, ancestor values of each selected filter value are determined. The ancestor values may be determined from the VALUE_ANCESTORS property received at S405.

At S790, an SQL script is generated including a sub-query WHERE statement which includes separate clauses for each common set of ancestor values, with the clauses separated by the OR operator. According to the present example, the following SQL script may be generated at S790:

```
SELECT   time.year_name, time.quarter_name, time.month_name,
         sum(sales.unit_sales)
FROM     time INNER JOIN sales on (time.time_id=sales.time_id)
WHERE    time.year_name + " + time.quarter_name + " +
         time.month_name IN
(
  SELECT   time.year_name + " + time.quarter_name + " +
           time.month_name
  FROM     time
  WHERE
  (
    (time.year = 'FY1997' AND time.quarter_name = 'Q1' AND
time.month_name IN ('January', 'March'))
```

```
    OR
    (time.year = 'FY1997' AND time.quarter_name = 'Q3')
    OR
    (time.year = 'FY1998' AND time.quarter_name = 'Q3' AND
time.month_name = 'July')
    )
)
```

In the above example, the clause including the common set of ancestor values "FY1997" and "Q1" for selected filter values "January" and "March" uses the INLIST operator for optimization purposes.

As described previously, the foregoing SQL script uses the concatenation function (i.e., time.year_name+"+time.quarter_name+"+time.month_name) in the sub-query to preserve the ancestor values of the filter value, and to thereby preserve the uniqueness of the selected filter values within the hierarchical LOV.

Data set 1300 may be retrieved at S415 based on the generated SQL script.

Figure 14:
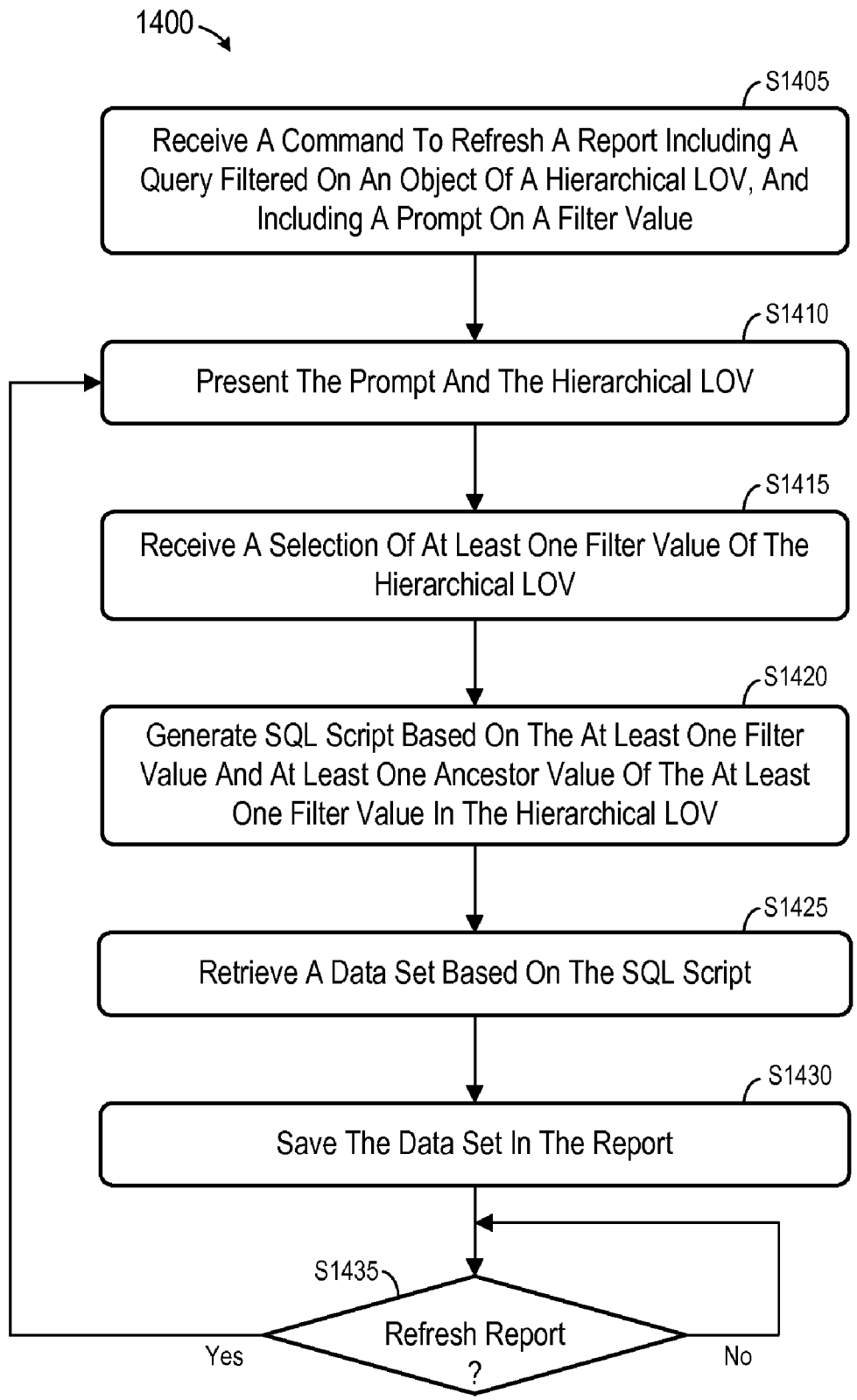
FIG. 14 illustrates a flow diagram of a process according to some embodiments.

The above description relates to execution of a report query including filter values specified by the query/report designer. A query may also be designed to prompt users for such filter values at report time (e.g., when the users refresh the report data). Process 1400 of FIG. 14 provides presentation of such a prompt with a hierarchical LOV and execution of a resulting query.

Figure 15:
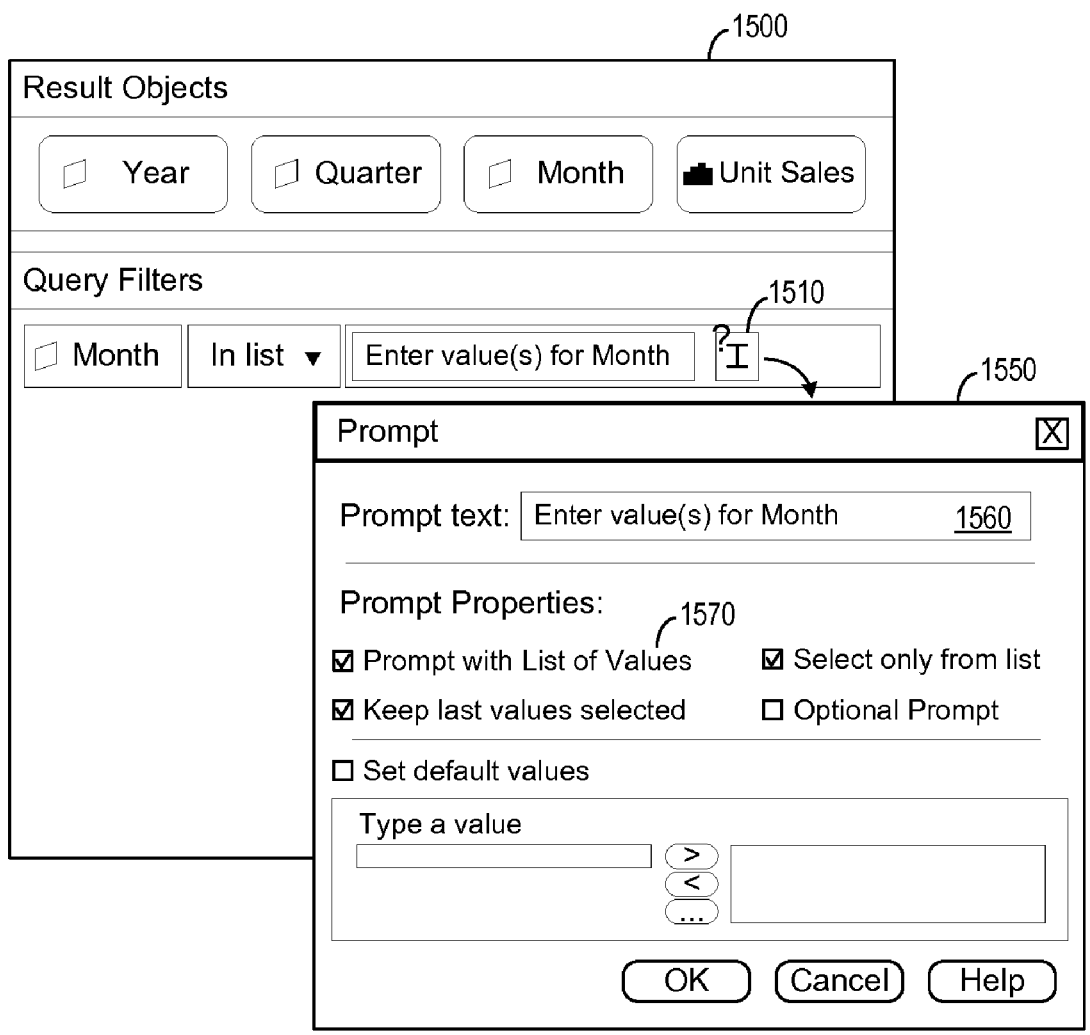
FIG. 15 is a view of a user interface to define a query according to some embodiments.
Figure 16:
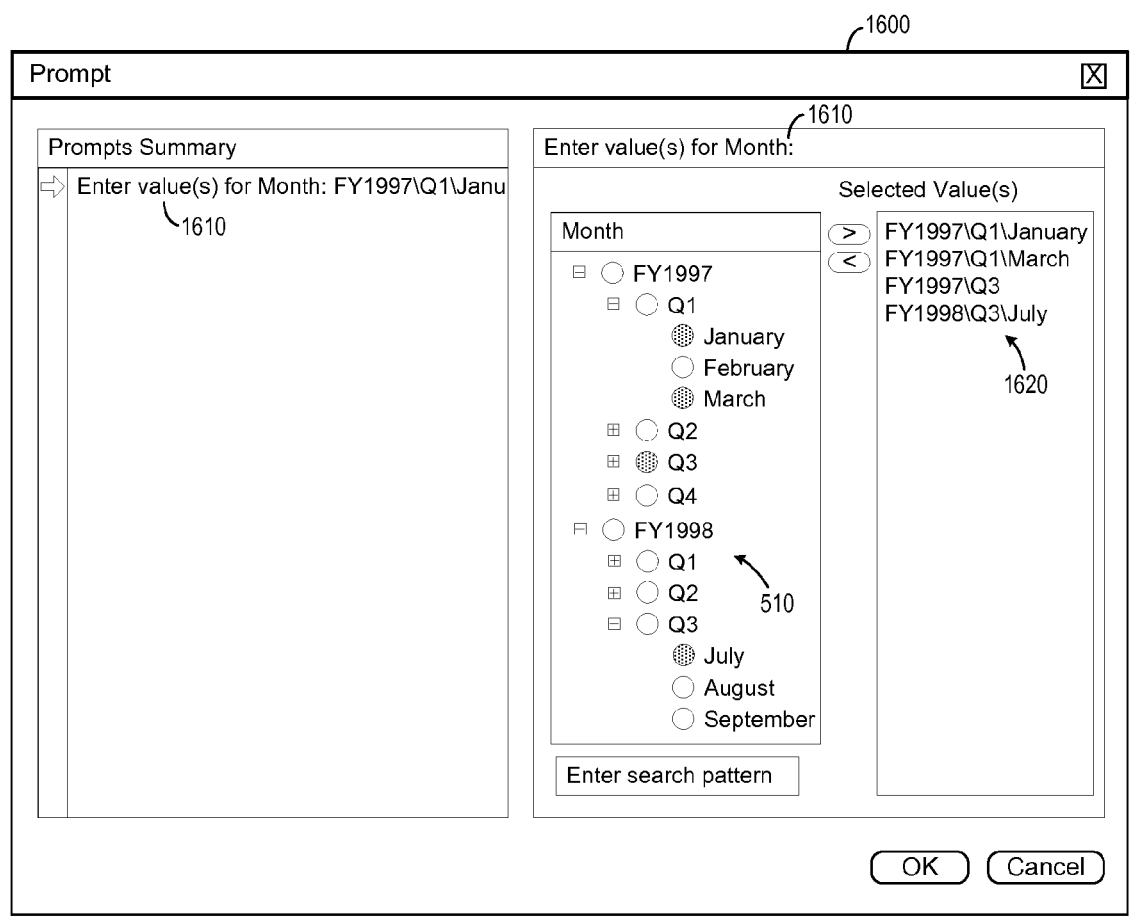
FIG. 16 is a view of a user interface to select filter values according to some embodiments.

FIG. 15 illustrates user interfaces 1500 and 1550 to define a report query including filter value prompts. Referring to interface 1500, the query is filtered on the Month object and returns result objects Year, Quarter, Month and Unit Sales. Instead of selecting one or more filter values from a hierarchical LOV as shown in FIGS. 5, 8, 10 and 12, the designer selects icon 1510 to invoke interface 1550. Interface 1550 allows a designer to specify prompt text 1560 and to select option 1570 to indicate that the prompt should include a list of values.

After the query is created, information engine 330 generates a corresponding SQL script such as the following:

```
SELECT  time.year_name, time.quarter_name, time.month_name,
        sum(sales.unit_sales)
FROM    time INNER JOIN sales on (time.time_id=sales.time_id)
WHERE   time.month_id IN
        @prompt('Enter value(s) for Month', 'A', 'Fiscal Year\Month',Multi,
        Primary_Key)
```

The SQL script is then saved with the query among report specifications 346 for later use. The @prompt syntax of the SQL script represents the prompt that will be displayed to users in order to allow the user to select filter values in the hierarchical LOV. The system will replace the @prompt syntax with the selected filter values.

At S1405, a command is received to refresh a report including a query which is filtered on an object of a hierarchical LOV, and which includes a prompt on a filter value. The command may be received from reporting client 310 by information engine 330, which retrieves a corresponding report specification from report specifications 346. Next, at S1410, information engine 330 presents the prompt and the hierarchical LOV associated with the filter object.

User interface 1600 presents a prompt and a hierarchical LOV according to some embodiments. User interface 1600, or a portion thereof, may be transmitted from information engine 330 to reporting client 310 for display to the user who issued the command received at S1405. The prompt is presented via prompt text 1610 and filter values may be selected from hierarchical LOV 510. In the illustrated example, the user has selected filter values "FY1997\Q1\January", "FY1997\Q1\March", "FY1997\Q3" and "FY1998\Q3\July". This selection is received at S1420.

Next, at S1420, an SQL script is generated based on the selected filter value(s) and at least one ancestor value of the selected filter value(s) in the hierarchical LOV. S1420 may proceed in any manner, including those described herein with respect to process 700. Therefore, if the filter object (i.e., Month) does not exhibit primary key index awareness, the SQL script may be generated as follows:

```
SELECT  time.year_name, time.quarter_name, time.month_name,
        sum(sales.unit_sales)
FROM    time INNER JOIN sales on (time.time_id=sales.time_id)
WHERE   time.year_name + " + time.quarter_name + " +
        time.month_name IN
/* begin @prompt substitution */
(
  SELECT  time.year_name + " + time.quarter_name + " +
          time.month_name
  FROM    time
  WHERE
  (
     (time.year = 'FY1997' AND time.quarter_name = 'Q1' AND
time.month_name IN ('January', 'March'))
     OR
     (time.year = 'FY1997' AND time.quarter_name = 'Q3')
     OR
     (time.year = 'FY1998' AND time.quarter_name = 'Q3' AND
time.month_name = 'July')
  )
)
/* end @prompt substitution */
```

Alternatively, if the filter object (i.e., Month) exhibits primary key index awareness, the SQL script may be generated as follows:

```
SELECT  time.year_name, time.quarter_name, time.month_name,
        sum(sales.unit_sales)
FROM    time INNER JOIN sales on (time.time_id=sales.time_id)
WHERE   time.month_id IN
/* begin @prompt substitution */
(
  SELECT time.month_id
  FROM    time
  WHERE
  (
     (time.month_id IN (19970101, 19970103, 19980307)
     OR
     (time.quarter_name = 'Q3' AND time.year = 'FY1997')
  )
)
/* end @prompt substitution */
```

Except for the comment portions, the foregoing SQL scripts are identical to those described above with respect to the FIG. 12 example. This similarity is welcome because the query of the FIG. 12 example is identical to the present query, in view of the filter values selected in interface 1600.

Accordingly, data set 1300 may be retrieved at S1425 based on either SQL script. The data set may be formatted into a report at S1430 based on the report specification, and the report may be saved among reports 348. Thereafter, any user having appropriate authorization may operate any reporting client to request the report from information engine 330.

Flow pauses at S1435 until a request to refresh the report is received. Upon receipt of such a request, flow returns to S1410 and continues as described above to present a prompt based on the query, receive at least one filter value of a hierarchical LOV based on the prompt, to generate an SQL script based on the query and the at least one filter value, and to retrieve a data set based on the SQL script. The retrieved data set will reflect any changes made to the requested data since a last refresh of the report.

Figure 17:
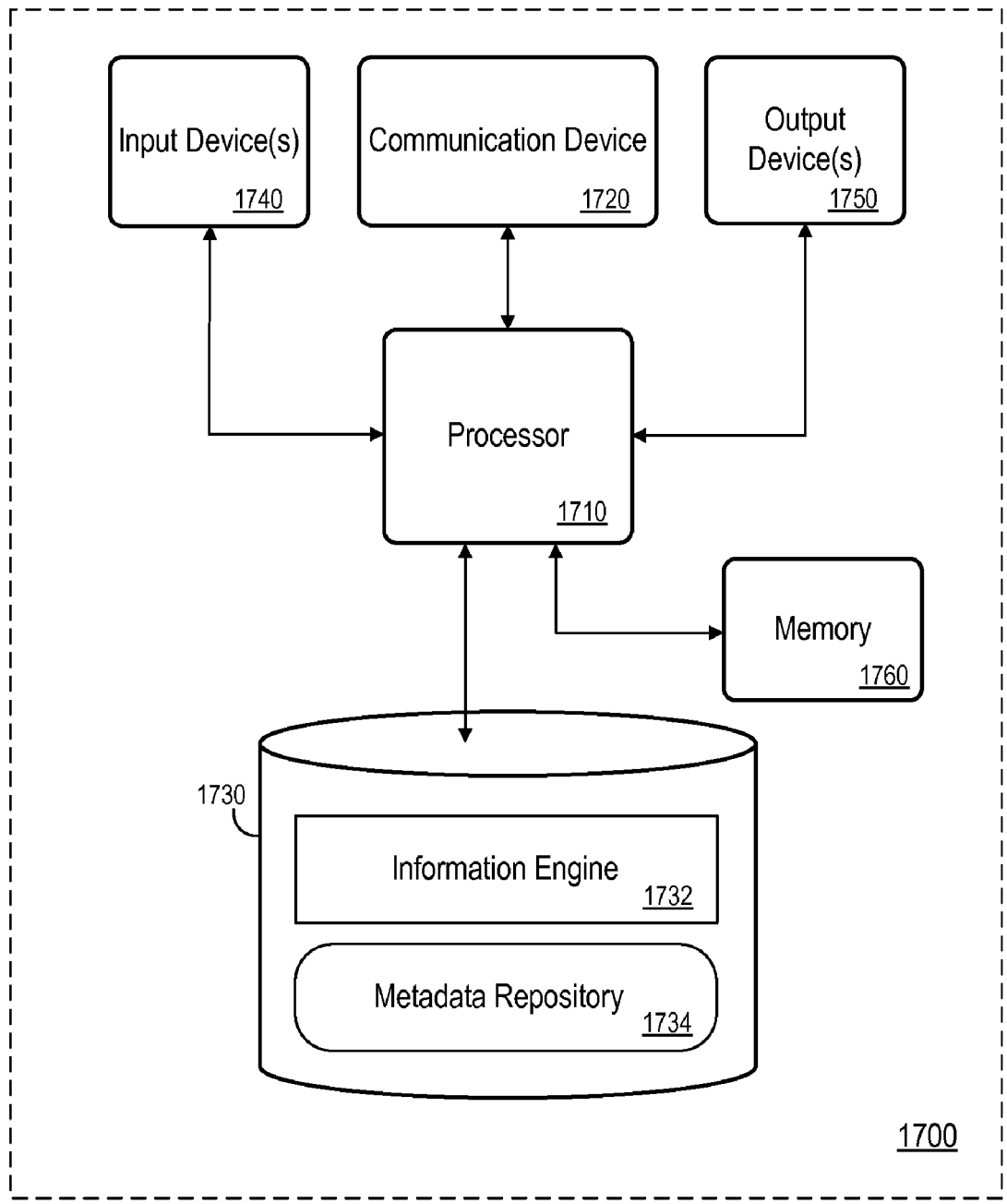
FIG. 17 is a block diagram of an apparatus according to some embodiments.

FIG. 17 is a block diagram of apparatus 1700 according to some embodiments. Apparatus 1700 may comprise a general-purpose computing apparatus and may execute program code to perform any of the functions described herein. Apparatus 1700 may comprise an implementation of information engine 330. Apparatus 1700 may include other unshown elements according to some embodiments.

Apparatus 1700 includes processor 1710 operatively coupled to communication device 1720, data storage device 1730, one or more input devices 1740, one or more output devices 1750 and memory 1760. Communication device 1720 may facilitate communication with external devices, such as a reporting client, or a data storage device. Input device(s) 1740 may comprise, for example, a keyboard, a keypad, a mouse or other pointing device, a microphone, knob or a switch, an infra-red (IR) port, a docking station, and/or a touch screen. Input device(s) 1740 may be used, for example, to enter information into apparatus 1700. Output device(s) 1750 may comprise, for example, a display (e.g., a display screen) a speaker, and/or a printer.

Data storage device 1730 may comprise any appropriate persistent storage device, including combinations of magnetic storage devices (e.g., magnetic tape, hard disk drives and flash memory), optical storage devices, Read Only Memory (ROM) devices, etc., while memory 1760 may comprise Random Access Memory (RAM).

Program code of information engine 1732 may be executed by processor 1710 to cause apparatus 1700 to perform any one or more of the processes described herein. Embodiments are not limited to execution of these processes by a single apparatus. Metadata repository may comprise any of the data described as stored in repository 340, but is not limited thereto. Data storage device 1730 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Moreover, each system described herein may be implemented by any number of devices in communication via any number of other public and/or private networks. Two or more devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

Embodiments described herein are solely for the purpose of illustration. Those in the art will recognize other embodiments may be practiced with modifications and alterations to that described above.

What is claimed is:

1. A non-transitory computer-readable medium having program code stored thereon, the program code executable by a processor to:
   receive a query filtered on an object of a hierarchical list of values and comprising a first filter value;
   generate an SQL script based on the first filter value and at least one ancestor value of the first filter value in the hierarchical list of values; and
   retrieve a data set associated with the query based on the SQL script;
   wherein generation of the SQL script comprises:
      determining that the object and the first filter value are associated with a same level of the hierarchical list of values; and
      determining a key of the first filter value, the key based on the at least one ancestor value of the first filter value,
      wherein a WHERE statement of the SQL script comprises the key.

2. A non-transitory computer-readable medium according to claim 1, wherein the query comprises a second filter value, and wherein generation of the SQL script comprises:
   determining that the object, the first filter value and the second filter value are associated with a same level of the hierarchical list of values; and
   determining a second key of the second filter value, the second key based on at least one ancestor value of the second filter value;
   wherein the WHERE statement of the SQL script further comprises the second key.

3. A non-transitory computer-readable medium according to claim 1, wherein reception of the query comprises:
   receiving a command to refresh a report including the query and a prompt on a filter value;
   presenting the prompt and the hierarchical list of values; and
   receiving the first filter value.

4. A non-transitory computer-readable medium having program code stored thereon, the program code executable by a processor to:
   receive a query filtered on an object of a hierarchical list of values and comprising a first filter value;
   generate an SQL script based on the first filter value and at least one ancestor value of the first filter value in the hierarchical list of values; and
   retrieve a data set associated with the query based on the SQL script;
   wherein generation of the SQL script comprises:
      determining that the object and the first filter value are associated with a same level of the hierarchical list of values; and
      determining the at least one ancestor value of the first filter value in the hierarchical list of values,
      wherein a WHERE statement of the SQL script comprises the first filter value and the at least one ancestor value.

5. A non-transitory computer-readable medium according to claim 4, wherein the query comprises a second filter value, and wherein generation of the SQL script comprises:
   determining that the object, the first filter value and the second filter value are associated with a same level of the hierarchical list of values; and
   determining at least one ancestor value of the second filter value in the hierarchical list of values,
   wherein the WHERE statement of the SQL script further comprises a first OR clause comprising the first filter value and the at least one ancestor value of the first filter value, and a second OR clause comprising the second filter value and the at least one ancestor value of the second filter value.

6. A non-transitory computer-readable medium having program code stored thereon, the program code executable by a processor to:
   receive a query filtered on an object of a hierarchical list of values and comprising a first filter value;
   generate an SQL script based on the first filter value and at least one ancestor value of the first filter value in the hierarchical list of values; and
   retrieve a data set associated with the query based on the SQL script;
   wherein generation of the SQL script comprises:
      determining that the object and the first filter value are not associated with a same level of the hierarchical list of values; and
      determining a key of the first filter value, the key based on the at least one ancestor value of the first filter value,
      wherein the SQL script comprises a sub-query, and
      wherein a WHERE statement of the sub-query comprises the key.

7. A non-transitory computer-readable medium according to claim 6, wherein the query comprises a second filter value, and wherein generation of the SQL script comprises:
   determining that the object, the first filter value and the second filter value are not associated with a same level of the hierarchical list of values; and
   determining a second key of the second filter value, the second key based on the at least one ancestor value of the second filter value,
   wherein the WHERE statement of the sub-query further comprises the second key.

8. A non-transitory computer-readable medium having program code stored thereon, the program code executable by a processor to:
   receive a query filtered on an object of a hierarchical list of values and comprising a first filter value;
   generate an SQL script based on the first filter value and at least one ancestor value of the first filter value in the hierarchical list of values; and
   retrieve a data set associated with the query based on the SQL script;
   wherein generation of the SQL script comprises:
      determining that the object and the first filter value are not associated with a same level of the hierarchical list of values; and
      determining the at least one ancestor value of the first filter value in the hierarchical list of values,
      wherein the SQL script comprises a sub-query, and
      wherein a WHERE statement of the sub-query comprises the first filter value and the at least one ancestor value.

9. A non-transitory computer-readable medium according to claim 8, wherein the query comprises a second filter value, and wherein generation of the SQL script comprises:
   determining that the object, the first filter value and the second filter value are not associated with a same level of the hierarchical list of values; and
   determining at least one ancestor value of the second filter value in the hierarchical list of values,
   wherein the WHERE statement of the sub-query comprises a first OR clause comprising the first filter value and the at least one ancestor value of the first filter value, and a second OR clause comprising the second filter value and the at least one ancestor value of the second filter value.

10. A system comprising:
    a data storage device storing data;
    a repository device storing metadata defining a hierarchical list of values; and
    an apparatus comprising a processor, the apparatus to:
       receive a query filtered on an object of a hierarchical list of values and comprising a first filter value;
       generate an SQL script based on the first filter value and at least one ancestor value of the first filter value in the hierarchical list of values; and
       retrieve a data set associated with the query based on the SQL script;
       wherein generation of the SQL script comprises:
          determining that the object and the first filter value are associated with a same level of the hierarchical list of values; and
          determining a key of the first filter value, the key based on the at least one ancestor value of the first filter value,
          wherein a WHERE statement of the SQL script comprises the key.

11. A system according to claim 10, wherein the query comprises a second filter value, and wherein generation of the SQL script comprises:
    determining that the object, the first filter value and the second filter value are associated with a same level of the hierarchical list of values; and
    determining a second key of the second filter value, the second key based on at least one ancestor value of the second filter value
    wherein the WHERE statement of the SQL script further comprises the second key.

12. A system according to claim 10, wherein reception of the query comprises:
    receiving a command to refresh a report including the query and a prompt on a filter value;
    presenting the prompt and the hierarchical list of values; and
    receiving the first filter value.

13. A system comprising:
    a data storage device storing data a repository device storing metadata defining a hierarchical list of values; and
    an apparatus comprising a processor, the apparatus to:
       receive a query filtered on an object of a hierarchical list of values and comprising a first filter value;
       generate an SQL script based on the first filter value and at least one ancestor value of the first filter value in the hierarchical list of values; and
       retrieve a data set associated with the query based on the SQL script;
       wherein generation of the SQL script comprises:
          determining that the object and the first filter value are associated with a same level of the hierarchical list of values; and
          determining the at least one ancestor value of the first filter value in the hierarchical list of values,
          wherein a WHERE statement of the SQL script comprises the first filter value and the at least one ancestor value.

14. A system according to claim 13, wherein the query comprises a second filter value, and wherein generation of the SQL script comprises:
    determining that the object, the first filter value and the second filter value are associated with a same level of the hierarchical list of values; and determining at least one ancestor value of the second filter value in the hierarchical list of values,
wherein the WHERE statement of the SQL script further comprises a first OR clause comprising the first filter value and the at least one ancestor value of the first filter value, and a second OR clause comprising the second filter value and the at least one ancestor value of the second filter value.

15. A system comprising:
a data storage device storing data;
a repository device storing metadata defining a hierarchical list of values; and
an apparatus comprising a processor, the apparatus to:
receive a query filtered on an object of a hierarchical list of values and comprising a first filter value;
generate an SQL script based on the first filter value and at least one ancestor value of the first filter value in the hierarchical list of values; and
retrieve a data set associated with the query based on the SQL script;
wherein generation of the SQL script comprises:
determining that the object and the first filter value are not associated with a same level of the hierarchical list of values; and
determining a key of the first filter value, the key based on the at least one ancestor value of the first filter value,
wherein the SQL script comprises a sub-query, and
wherein a WHERE statement of the sub-query comprises the key.

16. A system according to claim 15, wherein the query comprises a second filter value, and wherein generation of the SQL script comprises:
determining that the object, the first filter value and the second filter value are not associated with a same level of the hierarchical list of values; and
determining a second key of the second filter value, the second key based on the at least one ancestor value of the second filter value,
wherein the WHERE statement of the sub-query further comprises the second key.

17. A system comprising:
a data storage device storing data;
a repository device storing metadata defining a hierarchical list of values; and
an apparatus comprising a processor, the apparatus to:
receive a query filtered on an object of a hierarchical list of values and comprising a first filter value;
generate an SQL script based on the first filter value and at least one ancestor value of the first filter value in the hierarchical list of values; and
retrieve a data set associated with the query based on the SQL script;
wherein generation of the SQL script comprises:
determining that the object and the first filter value are not associated with a same level of the hierarchical list of values; and
determining the at least one ancestor value of the first filter value in the hierarchical list of values,
wherein the SQL script comprises a sub-query, and
wherein a WHERE statement of the sub-query comprises the first filter value and the at least one ancestor value.

18. A system according to claim 17, wherein the query comprises a second filter value, and wherein generation of the SQL script comprises:
determining that the object, the first filter value and the second filter value are not associated with a same level of the hierarchical list of values; and
determining at least one ancestor value of the second filter value in the hierarchical list of values,
wherein the WHERE statement of the sub-query comprises a first OR clause comprising the first filter value and the at least one ancestor value of the first filter value, and a second OR clause comprising the second filter value and the at least one ancestor value of the second filter value.

19. A method comprising:
receiving, by a processor, a query filtered on an object of a hierarchical list of values and comprising a first filter value;
generating, by the processor, an SQL script based on the first filter value and at least one ancestor value of the first filter value in the hierarchical list of values; and
retrieving, by the processor, a data set associated with the query based on the SQL script;
wherein generation of the SQL script comprises:
determining that the object and the first filter value are associated with a same level of the hierarchical list of values; and
determining a key of the first filter value, the key based on the at least one ancestor value of the first filter value,
wherein a WHERE statement of the SQL script comprises the key.

20. A method according to claim 19, wherein the query comprises a second filter value, and wherein generation of the SQL script comprises:
determining that the object, the first filter value and the second filter value are associated with a same level of the hierarchical list of values; and
determining a second key of the second filter value, the second key based on at least one ancestor value of the second filter value;
wherein the WHERE statement of the SQL script further comprises the second key.

21. A method according to claim 19, wherein reception of the query comprises:
receiving a command to refresh a report including the query and a prompt on a filter value;
presenting the prompt and the hierarchical list of values; and
receiving the first filter value.

22. A method comprising:
receiving, by a processor, a query filtered on an object of a hierarchical list of values and comprising a first filter value;
generating, by the processor, an SQL script based on the first filter value and at least one ancestor value of the first filter value in the hierarchical list of values; and
retrieving, by the processor, a data set associated with the query based on the SQL script;
wherein generation of the SQL script comprises:
determining that the object and the first filter value are associated with a same level of the hierarchical list of values; and
determining the at least one ancestor value of the first filter value in the hierarchical list of values,
wherein a WHERE statement of the SQL script comprises the first filter value and the at least one ancestor value.

23. A method according to claim 22, wherein the query comprises a second filter value, and wherein generation of the SQL script comprises:
- determining that the object, the first filter value and the second filter value are associated with a same level of the hierarchical list of values; and
- determining at least one ancestor value of the second filter value in the hierarchical list of values,
- wherein the WHERE statement of the SQL script further comprises a first OR clause comprising the first filter value and the at least one ancestor value of the first filter value, and a second OR clause comprising the second filter value and the at least one ancestor value of the second filter value.

24. A method comprising:
- receiving, by a processor, a query filtered on an object of a hierarchical list of values and comprising a first filter value;
- generating, by the processor, an SQL script based on the first filter value and at least one ancestor value of the first filter value in the hierarchical list of values; and
- retrieving, by the processor, a data set associated with the query based on the SQL script;
- wherein generation of the SQL script comprises:
  - determining that the object and the first filter value are not associated with a same level of the hierarchical list of values; and
  - determining a key of the first filter value, the key based on the at least one ancestor value of the first filter value,
  - wherein the SQL script comprises a sub-query, and
  - wherein a WHERE statement of the sub-query comprises the key.

25. A method according to claim 24, wherein the query comprises a second filter value, and wherein generation of the SQL script comprises:
- determining that the object, the first filter value and the second filter value are not associated with a same level of the hierarchical list of values; and
- determining a second key of the second filter value, the second key based on the at least one ancestor value of the second filter value,
- wherein the WHERE statement of the sub-query further comprises the second key.

26. A method comprising:
- receiving, by a processor, a query filtered on an object of a hierarchical list of values and comprising a first filter value;
- generating, by the processor, an SQL script based on the first filter value and at least one ancestor value of the first filter value in the hierarchical list of values; and
- retrieving, by the processor, a data set associated with the query based on the SQL script;
- wherein generation of the SQL script comprises:
  - determining that the object and the first filter value are not associated with a same level of the hierarchical list of values; and
  - determining the at least one ancestor value of the first filter value in the hierarchical list of values,
  - wherein the SQL script comprises a sub-query, and
  - wherein a WHERE statement of the sub-query comprises the first filter value and the at least one ancestor value.

27. A method according to claim 26, wherein the query comprises a second filter value, and wherein generation of the SQL script comprises:
- determining that the object, the first filter value and the second filter value are not associated with a same level of the hierarchical list of values; and
- determining at least one ancestor value of the second filter value in the hierarchical list of values,
- wherein the WHERE statement of the sub-query comprises a first OR clause comprising the first filter value and the at least one ancestor value of the first filter value, and a second OR clause comprising the second filter value and the at least one ancestor value of the second filter value.

* * * * *